(12) United States Patent
Chandler et al.

(10) Patent No.: US 6,477,491 B1
(45) Date of Patent: Nov. 5, 2002

(54) SYSTEM AND METHOD FOR PROVIDING SPEAKER-SPECIFIC RECORDS OF STATEMENTS OF SPEAKERS

(76) Inventors: Mark Chandler, P.O. Box 1506, Show Low, AZ (US) 85901; Daniel Altman, 3441 S. Saquaro Shadows Dr., Tucson, AZ (US) 85730

( * ) Notice: Subject to any disclaimer, the term of this patent is extended or adjusted under 35 U.S.C. 154(b) by 0 days.

(21) Appl. No.: 09/321,781

(22) Filed: May 27, 1999

(51) Int. Cl.[7] ............................................. G10L 15/26
(52) U.S. Cl. ...................................... 704/235; 704/246
(58) Field of Search ................................ 704/235, 246, 704/275

(56) References Cited

U.S. PATENT DOCUMENTS

| | | | |
|---|---|---|---|
| 3,879,751 A | | 4/1975 | Gimelli |
| 4,596,041 A | | 6/1986 | Mack |
| 4,924,387 A | | 5/1990 | Jeppesen |
| 5,272,571 A | | 12/1993 | Henderson et al. |
| 5,297,031 A | * | 3/1994 | Gutterman et al. ........... 705/37 |
| 5,309,504 A | * | 5/1994 | Morganstein ............... 379/67.1 |
| 5,463,547 A | * | 10/1995 | Markowitz et al. ......... 707/507 |
| RE35,658 E | | 11/1997 | Jeppesen |
| 5,710,591 A | * | 1/1998 | Bruno et al. ............. 348/14.09 |
| 5,745,875 A | | 4/1998 | Jackson et al. |
| 5,884,256 A | * | 3/1999 | Bennett et al. ............. 704/235 |
| 6,108,632 A | * | 8/2000 | Reeder et al. ............. 704/275 |

FOREIGN PATENT DOCUMENTS

WO          WO 97/11435          *   3/1997     ................ 704/275

* cited by examiner

*Primary Examiner*—Marsha D. Banks-Harold
*Assistant Examiner*—Donald L. Storm
(74) *Attorney, Agent, or Firm*—Gallagher & Kennedy, P.A.; Thomas D. MacBlain

(57) ABSTRACT

A speech processing system for the generation of speaker specific text output. To automatically generate a transcript of a trial, hearing, or. meeting, the system uses microphones dedicated to specific speakers along with one or more computers with speech recognition software assigned to each microphone. The system tracks the occurrences of speech and assembles a transcript of the participant's spoken words including the speaker's identity and a text version of the spoken words in the order the words were spoken.

30 Claims, 4 Drawing Sheets

SYSTEM AND METHOD FOR PROVIDING SPEAKER-SPECIFIC RECORDS OF STATEMENTS OF SPEAKERS

FIELD OF THE INVENTION

This invention relates to a multiple speaker speech processing system for automatically converting the vocal statements of multiple speakers into a unitary, combined record, and more particularly to a system that creates a transcript of a proceeding among multiple speakers, accurately transcribing the words and tracking the identity of each speaker.

BACKGROUND OF THE INVENTION

Stenographic and stenotype based reporting and transcriptions of meetings, conferences, hearings, judicial proceedings are well known. Even the best systems and methods have significant drawbacks. The use of a court reporter, stenographer or other person to record and transcribe proceedings requires a highly trained individual. Years of practice are required for a reporter to reach a high level of competence. Even with the extensive training and experience, however, that individual suffers from normal human frailties. One such frailty is fatigue. Another is the susceptibility to repetitive stress injury and other medical conditions brought on by extended use of a stenotype machine. A further shortcoming is the frequent inability of one to accurately transcribe overlapping conversations by two or more persons. Even experienced reporters have difficulty in such situations.

Computer software and stenotype machines with dedicated hardware are available that can convert the stenotyped input into text. These facilitate quicker availability of the transcript including real-time conversion from stenotyped input into text. The patent literature describes devices for improving the accuracy of stenographic transcription such as that of Jackson et al, U.S. Pat. No. 5,745,875. This patent describes the simultaneous recording of proceedings by a human reporter and a speech recognition unit. The parallel conversions of speech to written record allow each to serve as a check against the other in-real-time transcription. The reporter has the computer generated written words to compare against his or her stenotyped record. While the increased use of computers has streamlined the transcription process, the need for a reporter and the attendant problems have not been overcome.

Commercially available software for automatically converting speech to text is generally known as speech recognition software. Speech recognition quality ranges from poor, for speaker independent, limited vocabulary software, to reasonably good, for speaker dependent, trained software. A computer equipped with speaker independent software accepts speech input from any person and recognizes the 100,000 or so most commonly used words. Such software exhibits mediocre performance at best. A computer equipped with: speaker dependent trained software starts out as speaker independent. The individual whose voice is to be recognized is asked to participate in a training session, whereby the programmed computer comes to recognize the individual's speech. As the individual continues to use the computer and correct its mistakes, the computer refines its ability to accurately translate the speech of that individual. Software implementation of trained systems exists in commercial packages such as Via Voice Gold (IBM Corp.), Naturally Speaking Deluxe (Dragon Systems, Inc.), and Kurzweil VoicePro (Alpha Software).

As such, speech recognition has not replaced a human reporter. While the reporter may make errors when transcribing, he or she easily outperforms even the best computer systems in environments with multiple speakers. The speech recognition computer must take a digital representation of human utterances, determine where in this representation words begin and end, and finally use some algorithm or mapping model to convert the representation of the individual words into recognized words. These tasks are extremely complex for a computer faced with multiple speakers.

Voice recognition software is generally. not able to electronically recognize the identity of a speaker, i.e., tell one speaker from another. Nor does voice recognition software have the ability to deconstruct two overlapping vocal statements from two speakers, accurately reproduce written records of the statements and recognize who made them. The patent literature describes systems designed to record multiple speakers onto audio tape along with a tag indicating their identity. The art also describes systems that allow an audio tape to be recorded and synchronized to the keystrokes on the stenotype machine.

Individual microphones associated with dedicated transmitters, each transmitting on a different frequency are known for the purpose of differentiating between speakers. U.S. Pat. No. 4,596,041 to Mack describes such a system with a plurality of demodulators each tuned to one of the frequencies of the transmitters. Once demodulated, each speaker's statements are recorded. A means of recording a time indication at the beginning and end of each statement is described, as well.

Because, for computer speech recognition, the problems of discriminating among speakers and correctly recognizing overlapping words from different speakers have not been solved, no currently existing methods or systems are known that can listen to a hearing, conference or any type of conversation, distinguish among speakers, and correctly transcribe the spoken words into a transcript of the proceedings with speakers correctly identified.

SUMMARY OF THE INVENTION

In accordance with the present invention, a system using speech recognition for the preparation of transcripts of multi-speaker proceedings uses individual microphones assigned to individual speakers. Each microphone has a distinguishing characteristic, channel or line that is electrically distinctive to uniquely identify a particular. individual speaker from among all the speakers. Each statement at a microphone is transmitted to a computer with speech recognition software. Preferably, individual trained speech recognition components of the software convert to text the statements of the speakers. As used herein, "trained speech recognition software components" means either individual, trainable computer programs or portions or modules of a program, the portions or modules of which are capable of being trained to the speech of different individuals.

Conventionally, each microphone converts the sound from a particular speaker into an analog signal. In one preferred embodiment, each microphone is connected to a transmitter with its own assigned frequency. Signals representative of statements of speakers are transmitted in either analog or digital format. A multi-channel receiver has individual receiving sections tuned to the frequencies of the transmitters. These are connected with one or more computers running trained speaker dependent voice recognition software programming.

Alternatively, each microphone can be hard-wired to the remainder of the system, in which case the distinguishing characteristic of a particular speaker is the hard-wired channel on which the signal is transmitted. Certainly other methods of labeling the signal of a particular speaker's microphone can be employed. Whichever method of electrically distinguishing the statements from the microphones is used, the identification that this provides serves two purposes. It permits a speaker's statements to be directed to a software component trained to recognize her or his speech, and it allows the statements to be attributed correctly in the ultimate, assembled record.

In a preferred embodiment, a time stamping system is added that tracks the beginning and ending time of each speech segment. Once this timing data is combined with the speaker specific text, it is used to determine the order of assembly of the statements of the individual speakers into a combined transcript. A word-processing program assembles the text data into a transcript of the court proceeding, hearing, etc. In the present invention the transcript can be kept in electronic form, displayed on a computer monitor, printed, or otherwise manipulated and subsequently output.

The system can easily be used to record the spoken statements for later batch processing into text or as described, for real-time speech processing. Finally, an audio recorder can be usefully incorporated to provide an audio backup of the proceeding.

The above and further features and advantages of the invention will be better understood from the following description of a preferred embodiment, when taken with the accompanying drawing.

DETAILED DESCRIPTION OF THE PREFERRED EMBODIMENT

Figure 1:
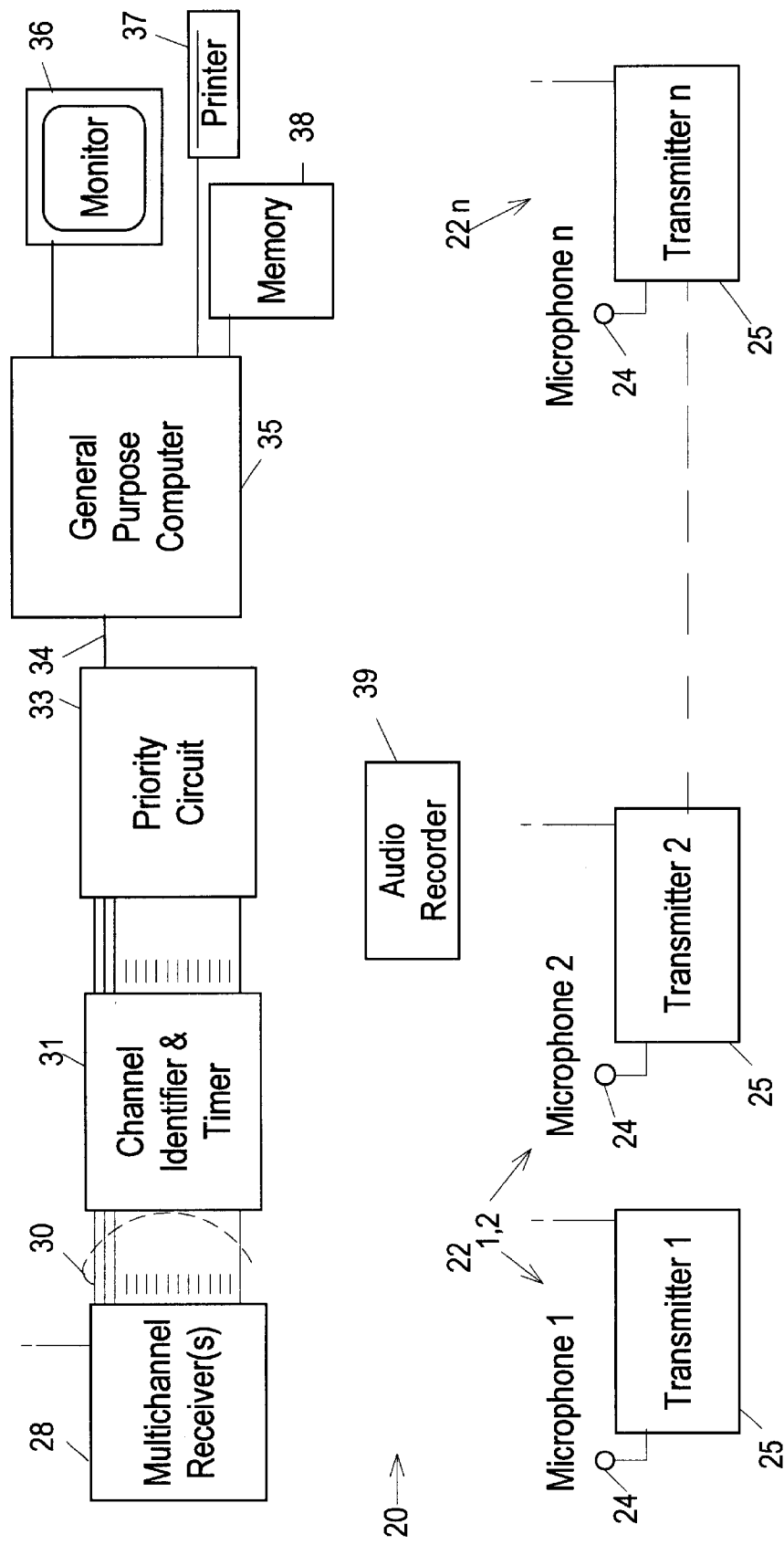
FIG. 1 is a schematic block diagram of a speech recording system according to the present invention and shows a plurality of microphones, each with a dedicated transmitter and a multichannel receiver for receiving transmitter outputs and passing them to a computer programmed with speech recognition software.

Turning to the drawings, in FIG. 1, a system 20 includes a series of speaker stations $22_1$–$22_n$. Each of these stations has a microphone 24 and connected radio frequency transmitter 25. It will be appreciated that the stations 22 can comprise a portable microphone, which is a commercially available, cordless unit that embodies both the microphone and transmitter. In the embodiment of FIG. 1, the transmitter 25 of each speaker station $22_1$ through $22_n$ has an assigned frequency different from the other speaker stations. Each speaker station is thus readily identifiable by its broadcast frequency. The transmitters 22 may transmit radio frequency analog signals representative of statements of speakers, or the transmitters may be equipped to convert the analog signals representative of statements to digital signals prior to transmission.

A multi-channel receiver 28 is in radio communication with the speaker stations 22. It may be a receiver having multiple channels tuned to the frequencies assigned to the speaker stations 22 or a bank of individual receivers each tuned to one of the speaker station frequencies. Multiple analog outputs 30 from the receiver 28 connect to a channel identifier and timer circuit 31. Each of the multiple outputs 30 corresponds to a received one of the radio frequency signals from one of the speaker stations 22 as demodulated by the receiver 28. Consequently, each speaker station broadcast is readily identifiable by the channel identifier and timer circuit 31. That circuit adds an identified or recognizable electrical "tag" that distinguishes the statements broadcast from one station 22 from those of another. The channel identifier and timer 31 may include a clock or timer. It adds a further component to the outputs 30 that it receives from receiver 28, which further component is indicative of the time at which or at least the order in which each statement representative signal is received from the receiver 28. A prioritizing or sequencing circuit 33 arranges in chronological order the statement representative signals that it receives from the channel identifier and timer circuit 31. These are fed serially at 34 to a general purpose computer 35. The prioritizing circuit may be a logic circuit or demultiplexer that serves to que up the received and demodulated outputs of the speaker stations based on their time of broadcast. Overlapping statements of the several speakers broadcast from each of the speaker stations $22_1$ through $22_n$ are thus tagged and prioritized based on the chronological order of the statements.

The general purpose computer 35 is programmed with multiple voice recognition software programs, each assigned to process the statements of a speaker at one of the speaker stations 22. The computer 36 is programmed to recognize in the signal input to it at 34 the identifier added by the channel identifier 32 and to assign each statement to its appropriate, dedicated speech recognition program. In known fashion, the speech recognition software interacts with a word processing program to output an electronic record of the proceedings as represented by the broadcasts from the speaker stations. This output is displayed by a monitor 36, printed as a transcript by a printer 37, or retained in a magnetic or other memory 38. Also included in the system 20 of FIG. 1 is a back-up audio recorder 39 that can be used for verification and correction of the displayed or printed text of the proceedings.

Figure 2:
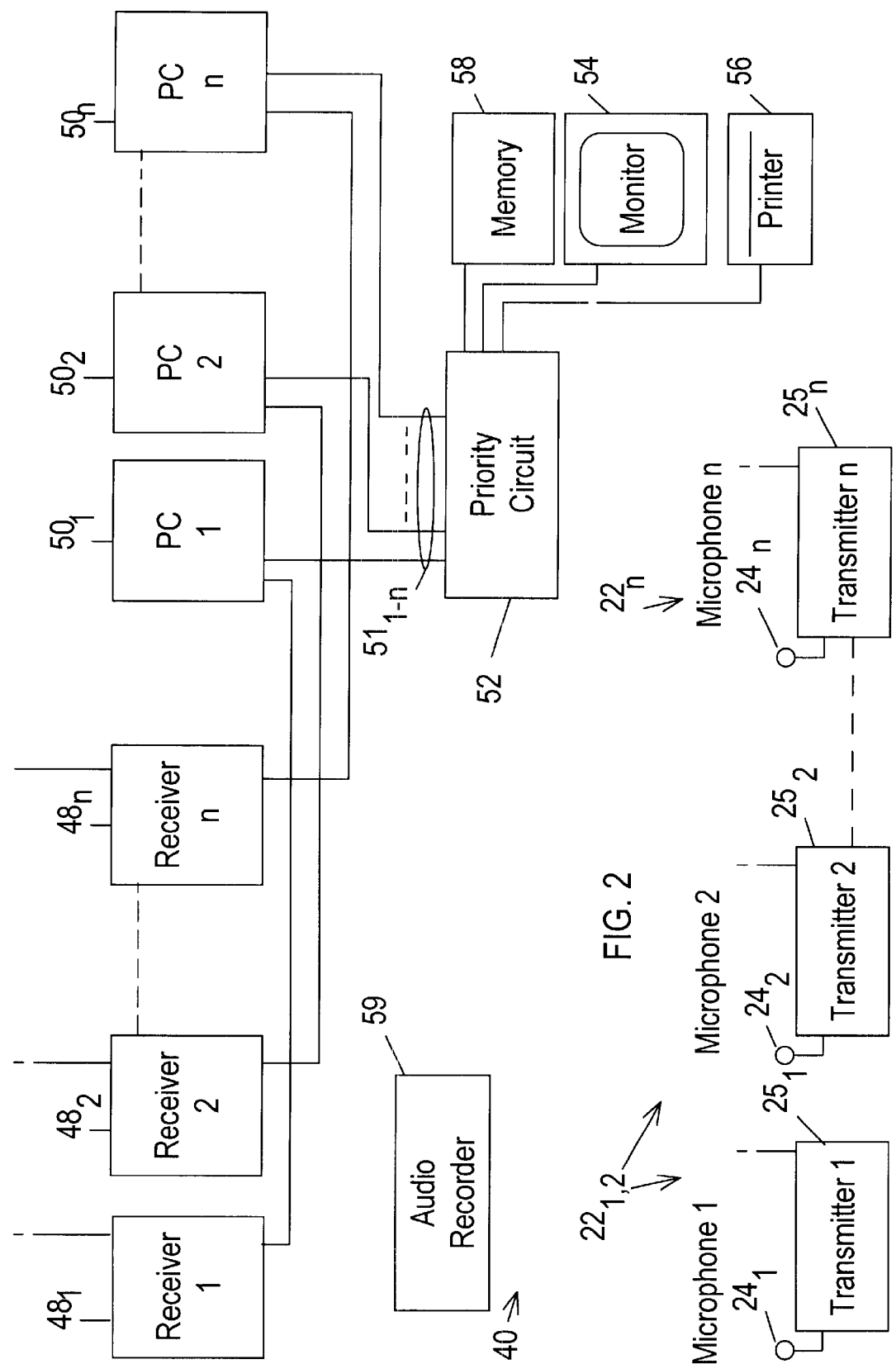
FIG. 2 is a schematic block diagram of a further embodiment of a speech recording system according to the present invention and shows microphones and dedicated transmitters like those of FIG. 1 and a series of individual receivers connected with individual computers equipped for voice recognition.

In FIG. 2, a further embodiment of the invention is a system 40 that, like the system 20 of FIG. 1, includes a series of speaker stations $22_1$–$22_n$, each with a microphone 24 and a transmitter 25. Again, the transmitters 25 are each tuned to a different frequency of transmission. The transmitters 25 may transmit radio frequency analog or digital signals. A series of receivers $48_1$ through $48_n$ receives the transmitted output of the stations $22_1$ through $22_n$. Each receiver 48 is tuned to one of the assigned frequencies of these stations 22.

Unlike the system of FIG. 1, the system 40 includes a bank of individual personal computers (PCs) $50_1$ through $50_n$. Each PC 50 is connected to one of the receivers 48. Each PC 50 is programmed with a trained voice recognition program and a compatible word processor. The voice recognition program of each PC is trained to the speech of a particular speaker at associated station 22. The demodulated outputs of the receivers 48 are fed to the PCs at their microphone inputs. The received statements are conventionally digitized and converted to text representative digital outputs. The PCs 50 may be programmed to add to each statement output the identity of the speaker at the associated speaker station. Likewise, each PC 50 may add to each statement that it outputs a time of receipt of that statement. A prioritizing circuit 52 receives parallel outputs $51_{1-n}$ representing speech from each of the stations $22_1$ and like the circuit 33 of FIG. 1, it prioritizes the converted speech on a chronological basis. Outputs from the prioritizer are serially fed to appropriate output devices such as the monitor 54 for display of the text, the printer 56 for printing of a transcript, or memory 58 for retention of a record of proceedings in magnetic or other memory. Again, for verification and correction of the text as prepared by the voice recognition and word processing programs, a back-up audio recorder 59 is provided.

Figure 3:
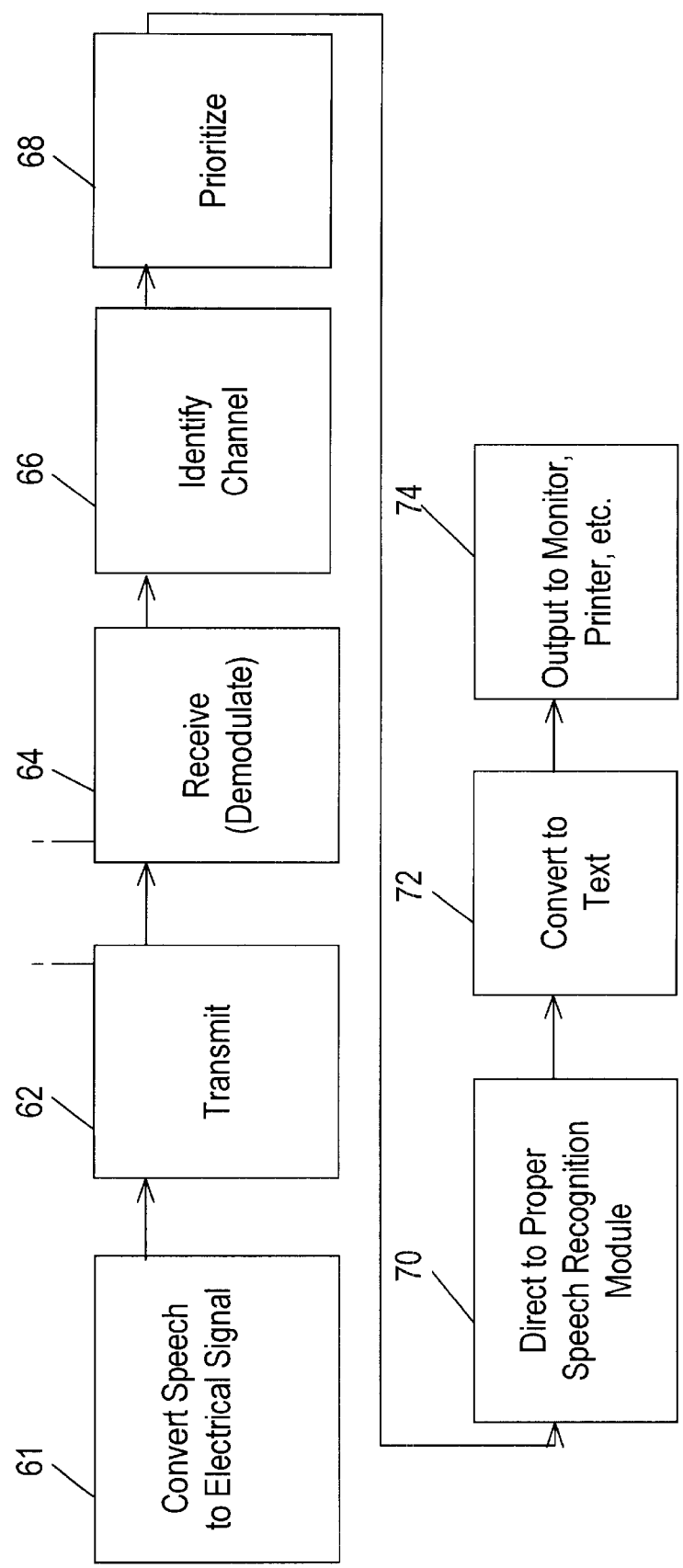
FIG. 3 is a block diagram of steps in an embodiment of the method of recording a multi-speaker proceeding according to the invention.

FIG. 3 illustrates the steps in the process of preparing a record of proceedings. At each station, the speech is converted by one of the microphones 24 to an electrical signal as represented by step 61. This is then transmitted at distinct radio frequencies as analog or digital signals, as indicated at step 62, to an associated one of the transmitters 25 of FIGS. 1 and 2. The signals thus transmitted are received by the multichannel receiver or bank of receivers as shown at 64. Demodulated, the speech records from the stations $22_{1-n}$ are transmitted to the channel identifier and timer circuit in the embodiment of FIG. 1 for recognition and identification of the individual speaker and order of occurrence by the addition of an electronic identifier or tag used to identify the speaker and a time indication indicative of start time and perhaps ending time, etc. The statements of the speakers are prioritized at step 68 on the basis of the indication of time of receipt. On the basis of their identification, made at step 66, the statements are directed, at 70, to the appropriate trained speech recognition programs or program modules of the, associated computer. That is to say, a trained speech recognition program or multiple trained speech recognition programs are contemplated, which will have received training as to the idiosyncrasies of speech of the individual speakers at the stations 22 so as to be able to convert the speech of each speaker to recognizable text at step 72. Thereafter, the statements are printed, stored, or displayed at step 74. Because each speakers voice is transmitted by personal microphone 24 and transmitter 25, it is separately recorded even when several or all participants in the proceeding speak at once.

Figure 4:
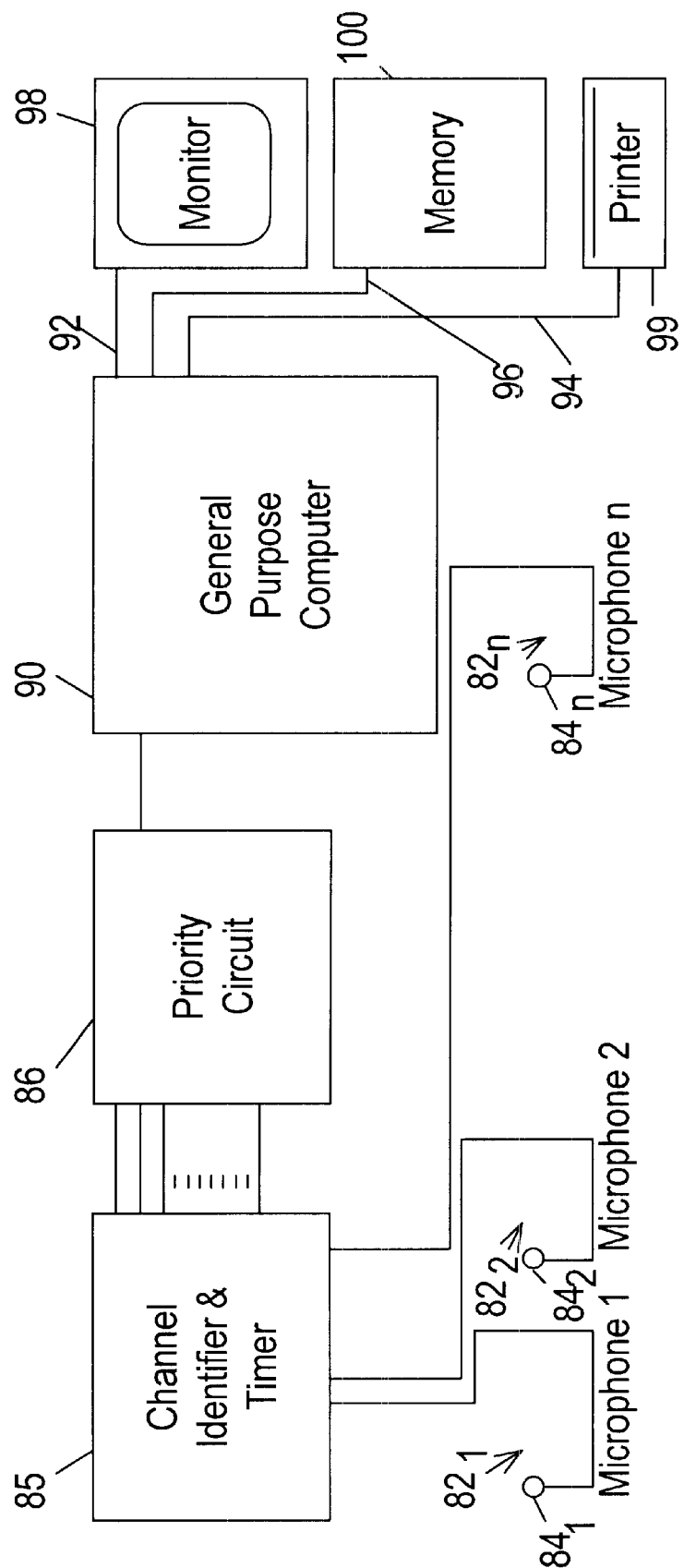
FIG. 4 is another schematic block diagram of another embodiment of speech recording system according to the invention and shows a plurality of dedicated microphones hard-wired to a computer for producing a record of a multi-speaker proceeding.

In FIG. 4, a further, hard-wired system 80 includes a series of speaker stations $82_1$ through $82_n$. Speaker stations $82_1$–$82_n$ have microphones $84_1$ through $84_n$. Each microphone 84 is hard-wired to a channel identifier and time circuit 85. That channel identifier and timer 85 adds to the received microphone output an identifier or tag based upon the input channel upon which an input is received and an indication of the order in which the individual statements were received. A prioritizing circuit 86 prioritizes the received microphone outputs chronologically based on the identified order of receipt added by the channel identifier and timer 85. The prioritizing circuit feeds the statements serially at an output 87 to a general purpose computer 90. Like the computers of the embodiments of FIGS. 1 and 2, the general purpose computer 90 is programmed with a trained speech recognition program or programs and a word processor. The computer routes the statement input to it to the appropriate voice recognition program or program module. The computer 90 outputs at 92, 94 and 96 to a monitor 98, a printer 99 and a memory 100.

While detailed descriptions of preferred embodiments of the systems and methods of the invention are set forth above, these are illustrative only and not to be construed as limiting the spirit and scope of the invention as set forth in the appended claims. It will be appreciated by those ordinarily skilled in the art that this invention may be accomplished in a number of different ways. For example, the radio frequency transmissions in the systems of FIGS. 1 and 2 may be AM or FM. Individual PCs at each of the speaker stations could be programmed with voice recognition circuitry, in which case the transmitted signals representative of statements of the speakers would be in text format, requiring only demodulation, prioritization and compiling centrally. It is contemplated that the system will affix the name of each speaker at the beginning of each statement based on recognition of the added tag or the channel on which the statement is transmitted. Certain proceedings may best be served by a hybrid system where only some of the speakers have voice recognition software trained to their speech. For example, a lengthy trial may economically use the features of the above-described invention in connection with the presiding judge, the trial attorneys and key fact and expert witnesses whose testimony can be expected to last hours or days, but occasional speakers such as witnesses whose testimony will be relatively short may be reported and transcribed in conventional fashion, by a reporter and transcribing typist. Also, it is contemplated that if untrained voice recognition is improved considerably, features of this invention, such as the tagging of statements with identifiers, prioritizing, etc., may be employed to great benefit even if it is not necessary to assign each speaker station its own trained voice recognition program or program module.

What is claimed is:

1. A system for providing a speaker-specific record of entire statements of a plurality of speakers at a court proceeding, conference, meeting or other event at which the plurality of speakers address subjects without the system imposing limitations on subject matter, comprising:

(a) a plurality of dedicated microphones for assignment to the plurality of speakers;

(b) means for electrically distinguishing each of the microphones;

(c) at least one computer programmed with speech recognition software including a plurality of dedicated speech recognition program components, each program component trained in the recognition, without subject matter limitation, of the speech of one of the speakers associated with one of the microphones; and (d) means for assembling together the records of speech of the plurality of speakers into a single electronic record.

2. The system of claim 1, wherein means for electrically distinguishing each of the speakers comprises a series of separate electrical channels.

3. The system according to claim 2, wherein the separate electrical channels include digital conversion and transmission means for converting analog voice representations to digital voice representations and transmitting the digital voice representations via the separate electrical channels to the means for assembling.

4. The system of claim 2, wherein the series of electrical channels comprises transmitters associated with the microphones, each transmitter having a distinct assigned frequency of transmission.

5. The system of claim 2, wherein the series of electrical channels comprises hard-wired channels.

6. The system of claim 1, further comprising timing means and means for associating the beginning time of each statement with that statement.

7. The system of claim 6, wherein the means for assembling together the records comprise means responsive to the beginning time associated with the statements for arranging the records of speech in order of the beginning times of the statements.

8. The system of claim 1, wherein the means for assembling together the records has a means for identifying in the assembled together record the individual speaker of each recorded statement based upon recognition of the means for electrically distinguishing each of the microphones.

9. The system according to claim 1, further comprising an output device connected to receive an electronic output representative of a text of the assembled record.

10. The system of claim 9, wherein the output device is selected from a group consisting of a printer, a display and a memory.

11. The system according to claim 1, wherein the means for electrically distinguishing comprises means for adding to electrically reproduced records of statements from said microphones an electronic identifier, distinguishing among the electrically reproduced statements corresponding to the several microphones.

12. The system according to claim 11, wherein said computer is programmed to. recognize each electronic identifier and to identify the source of an electrically reproduced statement based upon that recognition.

13. The system according to claim 12, wherein said computer is programmed to add a speaker identification to the assembled together records.

14. The system according to claim 1, wherein said at least one computer comprises a plurality of computers, each connected to receive electronic representations of statements from an assigned one of the microphones and each programmed with one of said speech recognition program components.

15. The system according to claim 14, further comprising means connected with the plurality of computers for assembling digital electronic outputs from the computers into a unified record of a proceeding.

16. The system according to claim 15, wherein each computer includes processor program operatively associated with said speech recognition program.

17. A system for providing a speaker-specific record of entire statements of a plurality of speakers at a court proceeding, conference, meeting or other event at which the plurality of speakers address subjects without the system imposing limitations in subject matter, comprising:
  (a) a plurality of dedicated microphones for assignment to the plurality of speakers,
  (b) at least one computer programmed with speech recognition software without subject matter limitation and a word processor program, and
  (c) electrically distinctive communication links connected to transmit recognizable outputs of the microphones to the at least one computer, whereby statements at the plurality of microphones are readily identifiable for conversion to a text record identifying the speakers based on the microphones into which they speak.

18. The system according to claim 17, wherein the at least one computer comprises at least one computer programmed with a plurality of trained speech recognition software components.

19. The system according to claim 17, further comprising a timer and means for chronologically prioritizing statements transmitted to the computer from the plurality of microphones.

20. The system according to claim 17, further comprising means for assembling together records of the statements from the microphones with speaker identifications.

21. A method for providing speaker specific text output from speech input of a plurality of speakers at a court proceeding, conference, meeting or other event at which the plurality of speakers address subjects without the system imposing limitations on subject matter, comprising:
  (a) assigning a plurality of dedicated microphones to a plurality of speakers to produce electrical signals representative of statements of the speakers;
  (b) electrically distinguishing signals representative of statements of each of the speakers;
  (c) processing the signals representative of statements of the plurality of speakers with at least one computer having speech recognition software without subject matter limitation, and
  (d) assembling into a combined electronic record the processed signals representative of the statements of the speakers along with indicia identifying the speakers based on recognition of the electrical identification of step (b).

22. The method according to claim 21, further comprising the step of converting analog signals representative of statements of the speakers to digital signals representative of statements of the speakers.

23. The method according to claim 22, further comprising transmitting the digital signals representative of statements of the speakers from a plurality of speaker stations at each of which is located one of the dedicated microphones to a receiver operatively coupled to the at least one computer.

24. The method according to claim 21, wherein the step of processing includes processing the signals representative of statements of the plurality of speakers with dedicated speech recognition program components trained in recognition of the speech of particular ones of the speakers associated with particular microphones.

25. The method of claim 21, wherein electrically identifying each of the speakers comprises providing a series of separate electrical channels.

26. The method of claim 25, wherein providing the series of electrical channels comprises providing separate assigned frequencies of transmission.

27. The method of claim 25, wherein providing the series of electrical channels comprises providing hardwired channels.

28. The method of claim 21, further comprising electronically noting at least the beginning time of each statement.

29. The method of claim 28, further comprising creating a chronologically compiled record of the statements using at least the beginning time of each statement.

30. The method of claim 28, further comprising compiling a transcript of statements of the speakers chronologically by prioritizing the statement-representative signals using at least the beginning time of each speech input.

\* \* \* \* \*